United States Patent [19]

Gurwicz

[11] Patent Number: 4,978,829
[45] Date of Patent: Dec. 18, 1990

[54] ELECTRIC DISCHARGE MACHINING POWER SUPPLY CIRCUIT

[75] Inventor: David Gurwicz, Gateshead, England
[73] Assignee: Nada Electronics Limited, England
[21] Appl. No.: 357,009
[22] Filed: May 25, 1989
[30] Foreign Application Priority Data May 27, 1988 [GB] United Kingdom ............... 8812675
Jun. 30, 1988 [GB] United Kingdom ............... 8815549

[51] Int. Cl.$^5$ .............................................. B23H 1/02
[52] U.S. Cl. ........................... 219/69.13; 219/69.18; 323/222; 323/271
[58] Field of Search ............... 323/271, 282, 285, 286, 323/222, 224, 266, 351; 363/124; 219/69.13, 69.18

[56] References Cited
U.S. PATENT DOCUMENTS 4,695,785 9/1987 Mieth et al. ..................... 323/222
4,727,308 2/1988 Huljak et al. ..................... 323/351
4,803,378 2/1989 Richardson ..................... 323/224
4,929,882 5/1990 Szepesi ..................... 323/222

Primary Examiner—A. D. Pellinen
Assistant Examiner—Geoffrey S. Evans
Attorney, Agent, or Firm—Kirchstein, Ottinger, Israel & Schiffmiller

[57] ABSTRACT

The power supply circuit has an inductor connected to a DC source through a regulating circuit arranged to maintain a constant current in the inductor. A MOSFET is connected to the inductor and to the spark gap so that when the MOSFET is conducting, current is diverted from the inductor to the spark gap. The frequency and mark-space ratio of switching of the switching device is controlled to control the machining process. A second switching device (40) is arranged to conduct when the voltage across a capacitor (34) exceeds a reference voltage. A diode (46) is used to return excess energy to the DC source.

7 Claims, 3 Drawing Sheets

ELECTRIC DISCHARGE MACHINING POWER SUPPLY CIRCUIT

This invention relates to control circuits for electric discharge machining.

Electric discharge machining, also known as "spark erosion", is a process by which metal is eroded from a work-piece by immersing the work-piece and a tool in a suitable dielectric medium and applying a repetitive voltage between the work-piece and tool to repeatedly initiate an electric discharge between the two. The gap between the work-piece and tool is maintained at a preset value by a servo mechanism which advances the tool as the work-piece is eroded. Depending on the materials and the degree of finish required, the discharge is initiated typically at a repetition rate of between 1 KHz and 1 MHz with conduction periods varying over the range 10% to 90%. The potential required to initiate the discharge depends also on the parameters mentioned, and can vary over the range 100–300 volts. Once the discharge is initiated, the "burning" voltage (i.e. the voltage across the gap) is a function of the dimensions of the gap and the electric current, and is typically 25 to 40 volts. The rate of material removal can be varied by varying the current flow during the burning phase, a typical generator enabling the current to be adjusted down to 1 ampere for "mirror" finishing and up to 60–100 amperes for rapid material removal. To achieve optimum results, the process has to be operated with the rise and fall times of current during initiation of the discharge and extinguishing of the arc at the end of each burning phase made as short as possible. Slow rates of rise and fall of the current result in contamination of the work-piece and tool due to burning of the dielectric, and hence poor material removal.

A conventional control circuit for electric discharge machining comprises a smoothed DC source of the required potential, typically derived from an AC source through a tapped transformer, rectifier and smoothing circuit. A number of transistor stages each consisting of a transistor in series with a fixed resistor, are connected in parallel between the DC source and the spark gap. To obtain a required current through the gap, control circuitry switches on a selected number of the transistors at the initiation of each discharge. Different value resistors are employed in the various stages to allow a number of different current settings.

The conventional apparatus has the disadvantage that its efficiency is low. For example, with a 100 bolt source and a burning voltage of 25 volts, 75% of the available power is dissipated in the resistive elements in the transistor stages. At a current of 100 amperes this represents a power loss of 7.5 kW. This is significant since the electric discharge machining process is a slow process, with a typical cycle stretching over many hours. To avoid overheating, extensive fan cooling of the system is required. Furthermore, to achieve the requisite high rates of current rise and fall, the resistors utilised in the transistor stages have to be of noninductive construction, and the DC supply has to be of low impedance, thus adding to the cost and complexity of the system. Moreover, the current flow through the gap is depenedent on the magnitude of the burning voltage, and therefore cannot be predicted with accuracy, owing to variations in the gap as the process continues.

It is an object of this invention to provide a control circuit for electric discharge machining which avoids these disadvantages.

This invention consists in a control circuit for electric discharge machining, for supplying current to a spark gap between a workpiece and tool, comprising a DC source, an inductive circuit connected to the DC source through regulating means arranged to maintain a constant current in the inductive circuit, switching means connected to the inductive circuit and to the spark gap and operable to divert the current in the inductive circuit to the spark gap, and means for establishing a predetermined voltage across the switching device and spark gap.

The current regulating means preferably comprises a chopper regulator.

Preferably, the switching means comprises a switching device connected to the inductive circuit in series with the spark gap so that when the switching device is conducting the current in the inductive circuit is diverted to the spark gap.

Alternatively the switching means may comprise a switching device connected in parallel with the spark gap, the spark gap being connected in the inductive circuit so that the current in the inductive circuit flows through the switching device when it is conducting and is diverted to the spark gap when the switching device is non-conducting.

Preferably, the means for establishing a predetermined voltage comprises a capacitor connected in a uni-directional current path in parallel with the switching device and spark gap so that charging current flows to the capacitor when the switching device is non-conducting, an inductor and a second switching device connected across the capacitor and means for switching on the second switching device when the capacitor voltage exceeds the predetermined voltage, the inductor being further connected to the DC source through a uni-directional current path in such a manner that when the second switching device is non-conducting excess energy from the capacitor and inductor is returned to the source.

Suitably, the inductive circuit comprises an inductor connected in series with the DC source, first switching device and spark gap, and a further switching device forming the regulating circuit, and a means for switching on and off the further switching device at a markspace ratio controlled in dependence on the current flowing through the inductor, thereby to maintain the current constant.

The first switching device, in series with the spark gap, may be a MosFet (metal-oxide-silicon field effect transistor).

The invention will now be described by way of example, with reference to the accompanying drawings in which.

Figure 1:
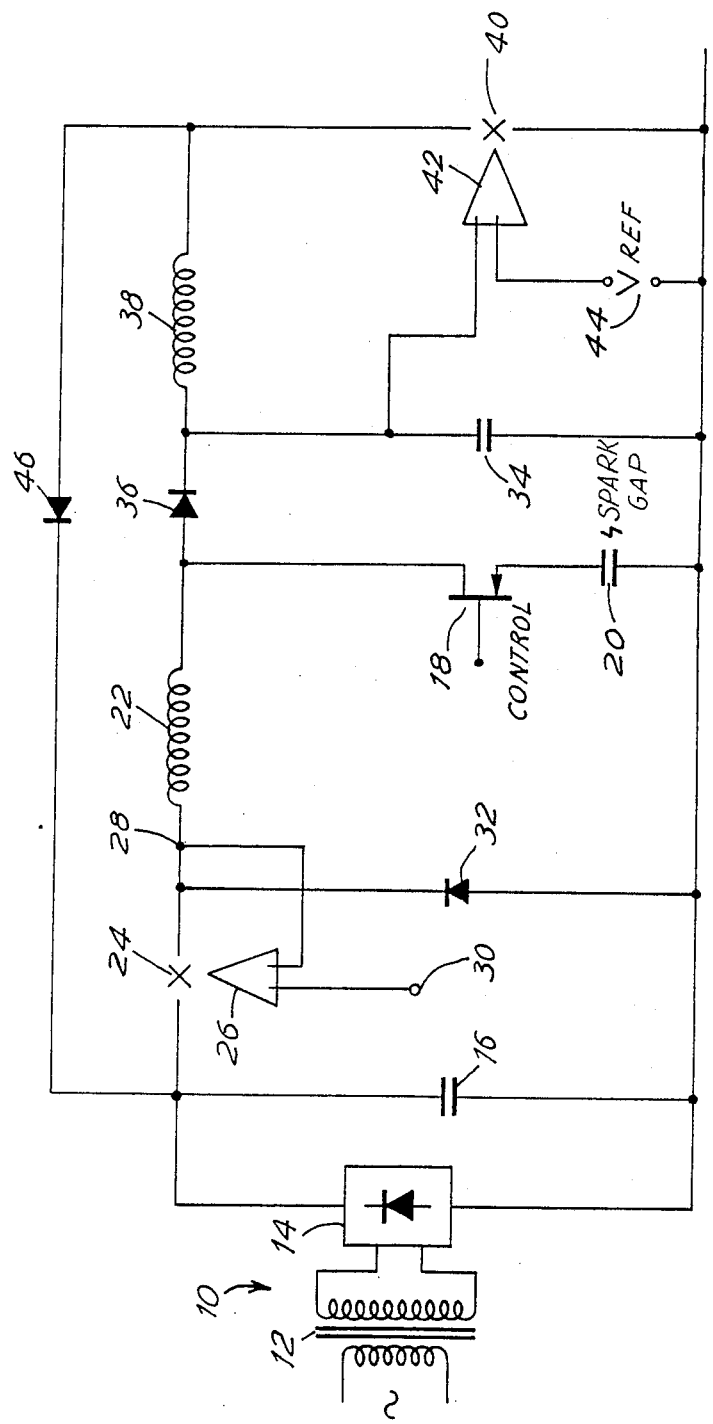
FIG. 1 is a circuit diagram of a control circuit for electric discharge machining in accordance with the invention.

Referring to FIG. 1, a DC source 10, comprising a transformer 12, rectifier 14 and smoothing capacitor 16, is arranged to supply a DC voltage in excess of the maximum discharge initiation voltage, for example 350 volts. A main switching device, in the form of a MosFet 18 is connected, in series with the spark gap 20, to the DC source through an inductor 22 and a switching device 24. The switching device 24, which may, for example, be a bipolar transistor or MosFet, is controlled by a comparator 26 which receives a signal from a current sensor 28 in series with the conductor and controls the mark-space ratio of the switching device 24 to maintain the inductor current at a level set by reference signal 30. A flywheel diode 32 is connected in parallel with the inductor 22, MosFet 18 and spark gap 20.

A capacitor 34 is connected in series with diode 36 across the MosFet 18 and spark gap 20. An inductor 38 is connected across capacitor 34 through a further switching device 40. The switching device 40, which may be a bipolar transistor or MosFet, is controlled by a comparator 42 which compares the voltage across the capacitor 34 with a reference voltage 44, so that the switching device 40 is switched on when the capacitor voltage exceeds a predetermined value corresponding to the desired discharge initiation voltage. A diode 46 is connected between the junction of inductor 38 and switching device 40 and the DC source 10.

In operation, current in the inductor 22 is maintained at a constant level set by reference signal 30, as described. When the circuit is first energised capacitor 34 is charged through diode 36 until the capacitor voltage reaches the required arc ignition level, whereupon switching device 40 is operated to allow current flow through inductor 38. During non-conducting periods of switching device 40, the energy stored in conductor 38 is returned to the DC source through diode 46. The level of energy dissipation in the circuit when the main MosFet 18 is non-conducting is therefore very low.

MosFet 18 is switched on and off at the desired frequency, as in the conventional circuit. When MosFet 18 is switched on to initiate the conventional circuit. When MosFet 18 is switched on to initiate discharge, the current established in inductor 22 is diverted through the spark gap 20.

The current in the spark gap during the burning phase is therefore accurately established. Since the capacitor 34 is charged to the voltage set by reference voltage 44 during non-conducting periods of MosFet 18, the voltage across the voltage 18 and the spark gap 20 is kept constant.

It will be appreciated that the described circuit has the following advantages:

(a) the efficiency of the system is very high compared with the conventional system. It is expected that the system efficiency approaching 95% could be achieved;

(b) the current through the gap during the burning phase is accurately defined, independent of the arc potential;

(c) the current rise and fall times on switching on and off of MosFet 18 are a function of the switching speeds of the MosFet and of any leakage inductance between the circuit and the spark gap 20, and are independent of the source inductance;

(d) both the discharge initiating voltage and the burning current can be made infinitely variable, by varying the reference signals 44 and 30.

Because the circuit employs fewer components than the conventional circuit, and avoids the need for a system for dissipating excessive power, the cost of the system is greatly reduced.

Figure 2:
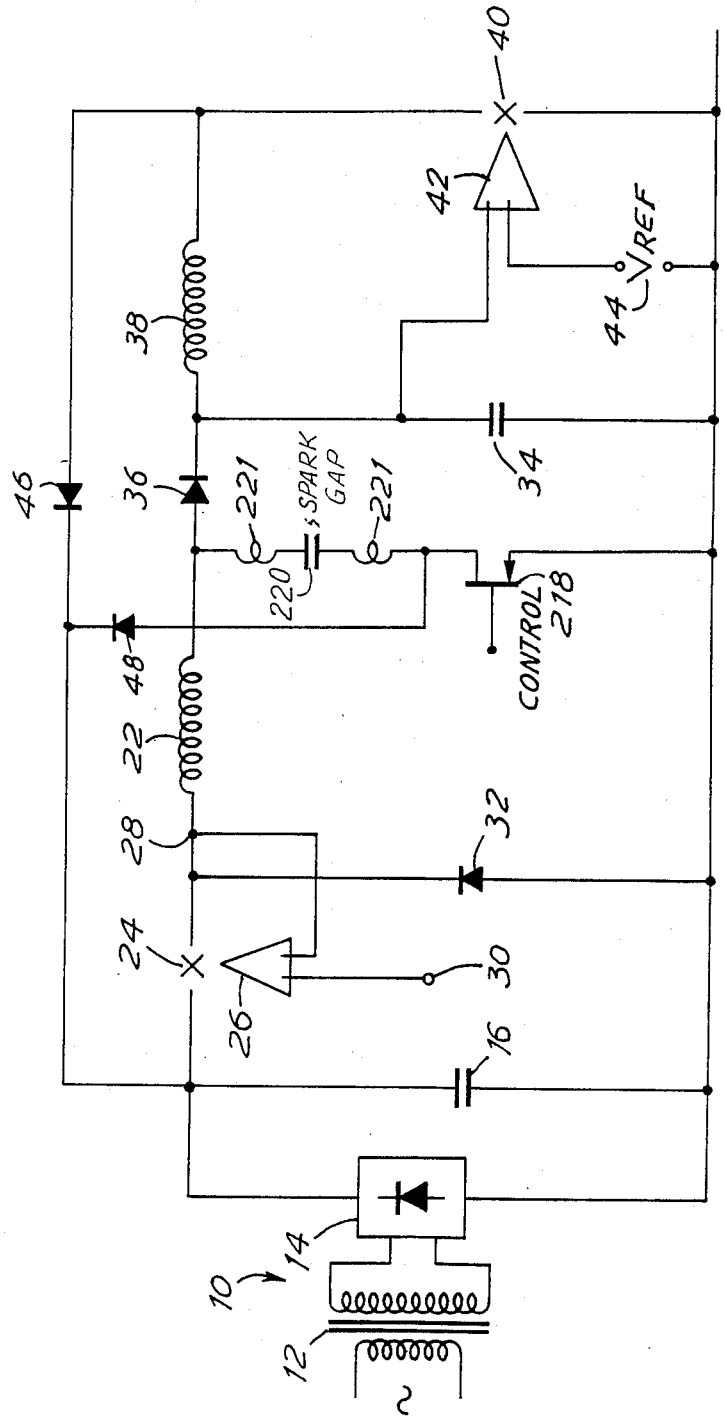
FIG. 2 shows a modified form of the circuit of FIG. 1.

In the modified circuit shown in FIG. 2, the components are the same as those in FIG. 1, except that the spark gap 220 and the control MosFet 218 are arranged so that the spark gap is connected to the junction of the inductor 22 and diode 36. An additional diode 48 is provided, with its anode connected to the junction of the MosFet 218 and spark gap 220 and its cathode connected to the positive side of the DC supply. The operation of the circuit is the same as that of the circuit of FIG. 1. The additional diode 48 provides a current path to allow energy stored in inductances in series with the spark gap (indicated by inductances 221 in FIG. 2) to be returned to the supply each time the MosFet 218 is switched off. The inductances 221 may be stray inductances or may be intentionally added to "tailor" the rate of rise of current on switching on the switch 218 to suit a particular application of the circuit.

Figure 3:
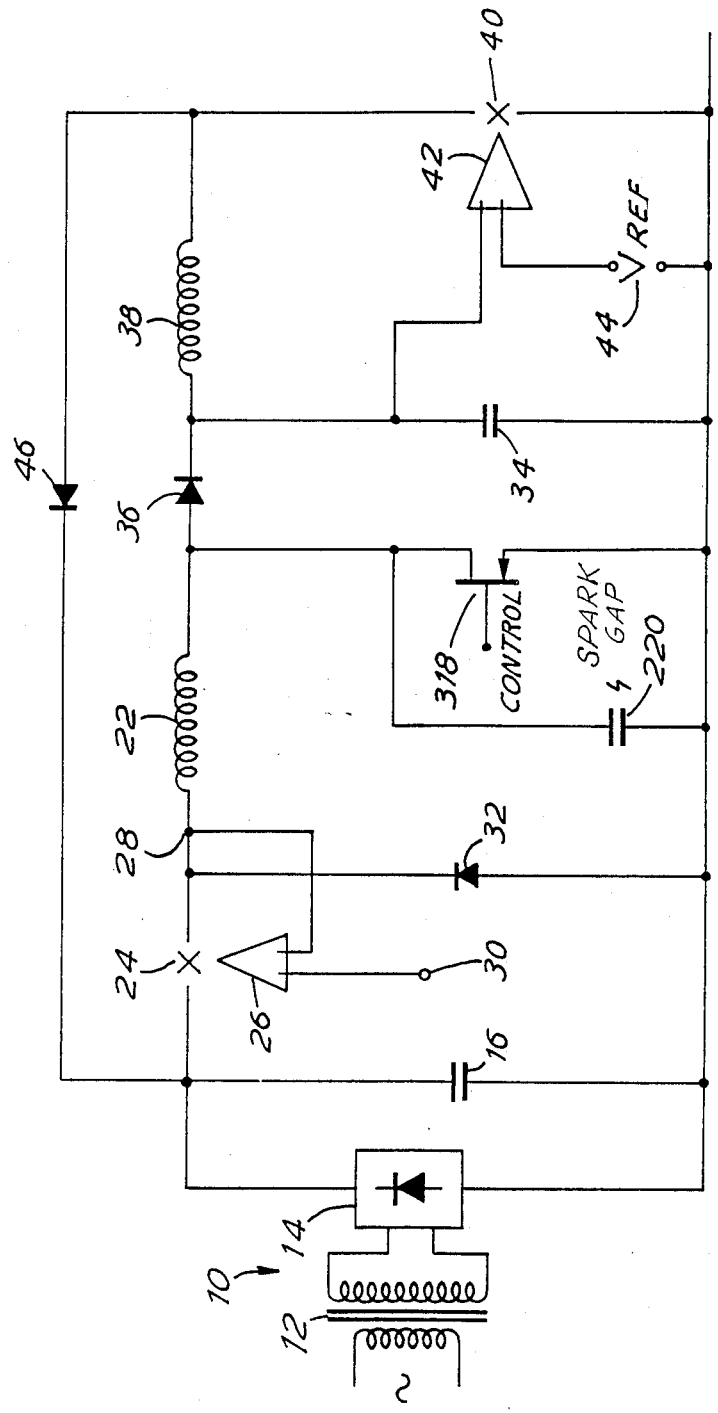
FIG. 3 is a circuit diagram of another embodiment of the invention.

FIG. 3 shows a further embodiment of the invention, in which the control MosFet 318 is connected in parallel with the spark gap 320. The MosFet and spark gap are connected to the DC source 10 through inductor 22 and switching device 24. The other components of the circuit are the same as those of FIG. 1 and function in the same way. In operation, when MosFet 318 is conducting, the constant current in inductor 22 flows through the MosFet 318 which shorts out the spark gap. When the MosFet 318 is switched off, the predetermined voltage across the capacitor 34 is applied to the spark gap 220, so that discharge is initiated, and the constant current is diverted to the spark gap. The operation is controlled by varying the mark-space ratio of conduction of the MosFet 318.

It will be appreciated that other modifications could be made in the described circuits. For example, other circuits for regulating the required constant current and predetermined voltage could be employed.

I claim:

1. A control circuit for electric discharge machining, for supplying current to a spark gap between a workpiece and tool, comprising a DC source, an inductive circuit connected to the DC source through regulating means arranged to maintain a constant current in the inductive circuit switching means connected to the inductive circuit, switching means connected to the divert the current in the inductive circuit to the spark gap, and means for establishing a predetermined voltage across the switching means and spark gap.

2. A control circuit as claimed in claim 1, in which the switching means comprises a switching device connected to the inductive circuit in series with the spark gap so that when the switching device is conducting the current in the inductive circuit is diverted to the spark gap.

3. A control circuit as claimed in claim 1, in which the switching means comprises a switching device connected in parallel with the spark gap, the spark gap being connected in the inductive circuit so that the current in the inductive circuit flows through the switching device when it is conducting and is diverted to the spark gap when the switching device is non-conducting.

4. A control circuit is claimed in claim 1, in which the means for establishing a predetermined voltage comprises a capacitor connected in a uni-directional current path in parallel with the switching means comprising a first switching device and spark gap so that charging current flows to the capacitor when the first switching device is non-conducting, an inductor and a second switching device connected across the capacitor and means for switching on the second switching device when the capacitor voltages exceeds the predetermined voltage, the inductor being further connected to the DC source through a uni-directional current path in such a manner that when the second switching device is non-conducting excess energy from the capacitor and inductor is returned to the source.

5. A control circuit as claimed in claim 1, in which the current regulating means comprises chopper regulating means.

6. A control circuit as claimed in claim 5, in which the inductive circuit comprises an inductor connected in series with the DC source, the switching means comprising a first switching device and spark gap, and a further switching device forming the regulating circuit, and a means for switching on and off the further switching device at a markspace ratio controlled in dependence on the current flowing through the inductor, thereby to maintain the current constant.

7. A control circuit as claimed in claim 1, in which the switching means in series with the spark gap is a metal-oxide-silicon field effect transistor.

* * * * *